J. L. COOK.
STEERING GEAR LOCKING MECHANISM.
APPLICATION FILED DEC. 1, 1917.
1,265,057.
Patented May 7, 1918.
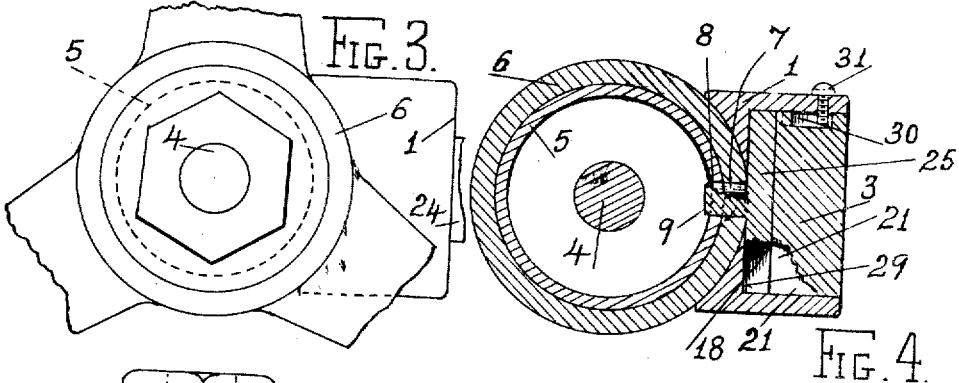
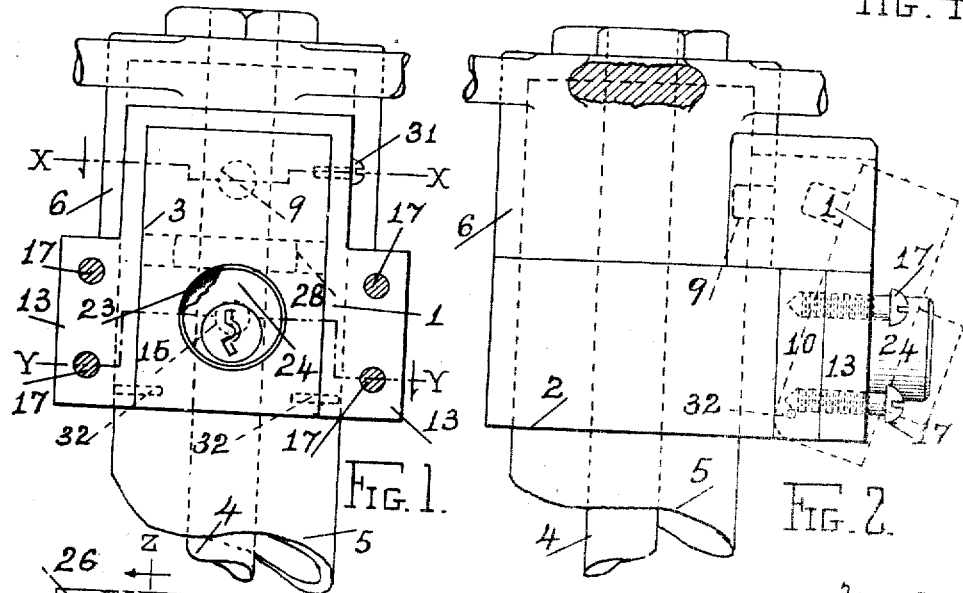
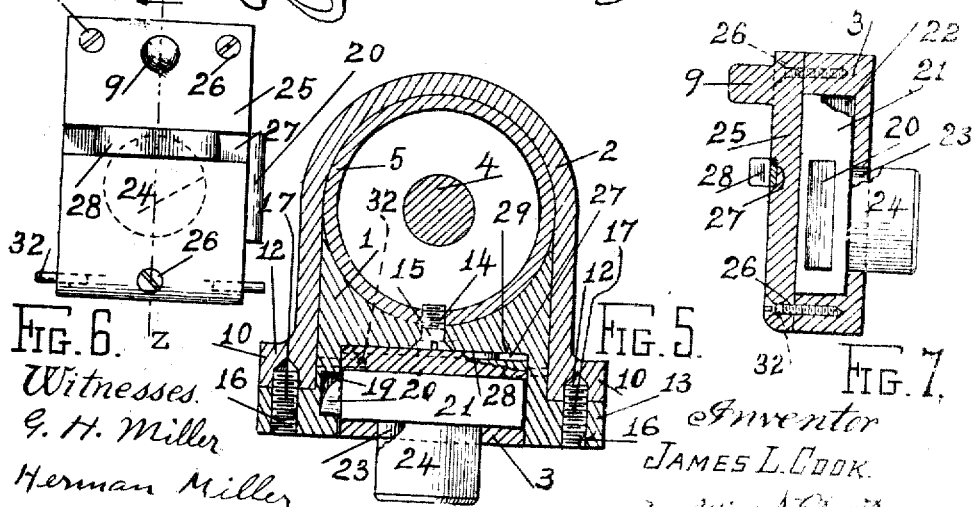
Witnesses
G. H. Miller
Herman Miller
Inventor
James L. Cook
by Atty N. DuBois

UNITED STATES PATENT OFFICE.

JAMES L. COOK, OF SPRINGFIELD, ILLINOIS.

STEERING-GEAR-LOCKING MECHANISM.

1,265,057.  Specification of Letters Patent.  Patented May 7, 1918.

Application filed December 1, 1917. Serial No. 204,824.

*To all whom it may concern:*

Be it known that I, JAMES L. COOK, a citizen of the United States, residing at Springfield, in the county of Sangamon and State of Illinois, have invented a new and useful Steering-Gear-Locking Mechanism, of which the following is a specification.

The invention relates to locking mechanism applicable to the steering gear of self-propelling vehicles, such as automobiles, boats, or the like.

The general purpose of the invention is to provide simple and effective means whereby the steering wheel may be locked to prevent rotation of the steering wheel on the steering column, thereby rendering the steering gear ineffective to guide the vehicle while the steering gear is locked, thus preventing stealing or unauthorized use of the vehicle. More specific purposes of the invention are; to provide a casing and connecting devices adapted for permanent attachment to the steering column of the vehicle without removing the steering wheel, and adapted to prevent movement of the casing in the direction of the length of the steering column, and also adapted to prevent rotation of the casing on the steering column; to provide a locking-block having a hinge connection with the casing and equipped with means adapted to lock the locking-block in the casing; to provide means to prevent rotation of the steering wheel; and to provide other new and useful structural details.

The invention is illustrated in the annexed drawing, to which reference is hereby made, and is hereinafter particularly described and finally recited in the claims.

Figure 1— is a front elevation of the steering-gear locking-mechanism in place on the steering column of a vehicle.

Fig. 2— is a side elevation.

Fig. 3— is a top plan.

Fig. 4— is a horizontal transverse section on the line X, X, of Fig. 1.

Fig. 5— is a horizontal transverse section on the line Y, Y, of Fig. 1.

Fig. 6— is an elevation of the locking-block as viewed from the inside, and

Fig. 7— is a vertical section on the line Z, Z, of Fig. 6.

The same reference numerals designate the same parts in the different views.

The casing 1, the strap or band 2, and the locking-block 3, are preferably of steel, but other material of suitable strength may be used.

The steering shaft 4, the steering-column 5, and the steering-wheel hub 6 may be of any usual or approved construction. In practice the steering-gear locking-mechanism will be made to conform to the steering column and the hub of the steering wheel with which it is to be used.

Alined holes 7 and 8 will be drilled radially through the wall of the hub 6 and through the wall of the steering column 5 to accommodate the stud 9 on the back-plate 25 of the locking-block 3.

A screw-threaded hole 14 through the wall of the steering column accommodates the screw 15 (Fig. 5) which connects the casing 1 with the steering column to prevent either rotation or longitudinal movement of the casing on the steering column. The center of the hole 8 and the center of the hole 14 are in a vertical plane of the axis of the steering-shaft 4. When the mechanism is locked the hole 7 will be at the front of the hub 6 and in registry with the hole 8 in the steering column, so that when the mechanism is locked the stud 9 of the locking-block will occupy both holes 7 and 8 and will prevent rotation of the hub on the steering column. The stud 9 being in both holes 7 and 8 greatly strengthens the connection so that there is less risk of shearing the stud than there would be if it occupied the hole 7 only.

The U-shape band 2 has as its terminals lateral members 10 provided with screw-threaded holes 12. The casing 1 has lateral members 13 provided with screw-threaded holes 16 which, when the parts are assembled, register with the holes 12; and screws 17 in the holes 12 and 16 securely connect the parts as shown in Fig. 5. When the parts have been connected as described, the projecting parts of the screws will be cut off close to the outer face of the members 13 and the outer ends of the screw stubs will be finished smooth so that the screws can not be removed by any instrument ordinarily available.

In the casing 1 is a recess 18 adapted to accommodate the locking-block 3, and in one inner wall of the recess 18 is a mortise 19 (Fig. 5) adapted to accommodate the bolt 20 of the lock 21.

The locking-block 3 is designed to house locks 21 of standard manufacture already on the market, and for that purpose has a transverse channel 22 (Fig. 7) adapted to accommodate the body 21 of the lock proper, and has in the front wall of the block a circular opening 23 through which the lock cylinder 24 projects, as clearly shown. A back-plate 25 (Figs. 6 and 7) is connected with the locking-block by screws 26. The plate 25 has a transverse channel 27 which accommodates a curved spring 28; and when the locking-block is locked in the casing, the spring 28 compressed by engagement against the inner wall 29 of the casing will lie flat in the channel 27, and when the bolt 20 is retracted the spring will act to turn the block on its pivots 32 and move the upper part of the block outward to retract the stud 9 from the holes 8 and 7 to permit free rotation of the hub 6 on the steering column 5. In one side of the block 3, near its upper end, is an arcuate slot 30 accommodating the point of a screw 31 which extends through the wall of the casing into the slot. When the locking-block is turned outwardly by the action of the spring 28 the inner end wall of the slot will strike against the screw to prevent excessive outward movement of the locking-block.

The lock 21 is a spring lock. When the locking-block 3 has been moved outwardly and stopped in unlocked position—indicated by dotted lines in Fig. 2—and the vehicle has been used, the mechanism may be again locked merely by turning the steering wheel by hand to bring the hole 7 into line with the hole 8 and the stud 9 and then pressing the locking-block inward by hand to cause the stud 9 to enter the holes 7 and 8 and to cause the bolt 20 to enter the mortise 19 to hold the parts in locked position.

I have shown and described a locking-block consisting of two parts 3 and 25 joined together, and have shown a lock 21 of the type known as a cylinder lock, the body of the lock being located in a chamber 22 in the locking-block. I do not however, restrict my claims to the precise construction shown, since it is obvious that the locking-block may be a one-piece structure and that any lock having a bolt 20 adapted to enter and occupy the mortise 19, may be used therein without departure from my invention.

Having fully described my invention, what I claim as new and desire to secure by Letters Patent is:

1. In steering-gear locking-mechanism, the combination of a steering column; a casing adapted to be permanently attached to the steering-column and having a mortise to receive a locking bolt; a hub adapted to rotate on the steering column and having in its walls a radial hole adapted to accommodate a stud; and a pivoted locking-block having a stud adapted to enter the hole in the hub; and a bolt adapted to enter the mortise in the casing to lock the locking-block in the casing and the stud in the hole in the hub.

2. In steering-gear locking-mechanism, the combination of a steering column having a radial hole in its wall, a hub adapted to rotate on the steering column and having in its wall a radial hole registrable with the radial hole in the steering column; a casing stationary on the steering column; and a locking-block pivoted in the casing and having a stud adapted to occupy the radial hole in the hub and the radial hole in the steering column.

3. In steering-gear locking-mechanism, the combination of a steering-column; having a radial hole; a hub rotative on the steering column and having a radial hole registrable with the radial hole in the steering column; a casing stationary on the steering-column; a locking-block pivoted in the casing and having a stud adapted to simultaneously occupy the radial hole in the hub and the radial hole in the steering-column; and a spring adapted to be compressed by pressing the locking-block inward in the casing and acting to turn the locking-block outwardly on its pivots to retract the stud of the locking-block from the alined radial holes in the steering-column and the hub.

4. In steering-gear locking-mechanism, the combination of a steering column; a casing stationary on the steering-column; a locking-block pivoted in the casing and having an arcuate slot adapted to accommodate a stop; and a stop on the casing occupying the arcuate slot in the locking-block and effective to limit outward turning of the locking-block on its pivots.

5. A locking-block comprising a body having a chamber adapted to accommodate a lock; a back-plate having a stud and a transverse channel; a spring in the transverse channel of the back-plate and means for securing the back-plate on the body of the locking-block.

6. A casing for steering-gear locking-mechanism comprising a body conformed to the circumference of a steering column and having a chamber adapted to accommodate a locking-block; and a securing device within the chamber adapted to prevent rotation of the casing on the steering column; in combination with a locking-block in the chamber of the casing and covering the securing device to prevent its withdrawal when the locking-block is locked.

7. In steering-gear locking-mechanism, the combination of a casing having a chamber; a locking-block occupying the chamber of the casing; pivots extending through the respective side walls of said chamber into said locking-block; and a strap inclosing the casing and covering and preventing access to the pivots.

In witness whereof I have hereunto signed my name at Springfield, Illinois, this 27 day of November, 1917.

JAMES L. COOK.

Witnesses:
    NATHAN COLE,
    HERMON COLE.